(No Model.) 2 Sheets—Sheet 1.

M. L. SEVERY.
APPARATUS FOR THE UTILIZATION OF SOLAR HEAT.

No. 497,079. Patented May 9, 1893.

Witnesses.
D. W. Allen.
A. L. Carpenter.

Inventor.
Melvin L. Severy
by Howe & Kellogg
attys.

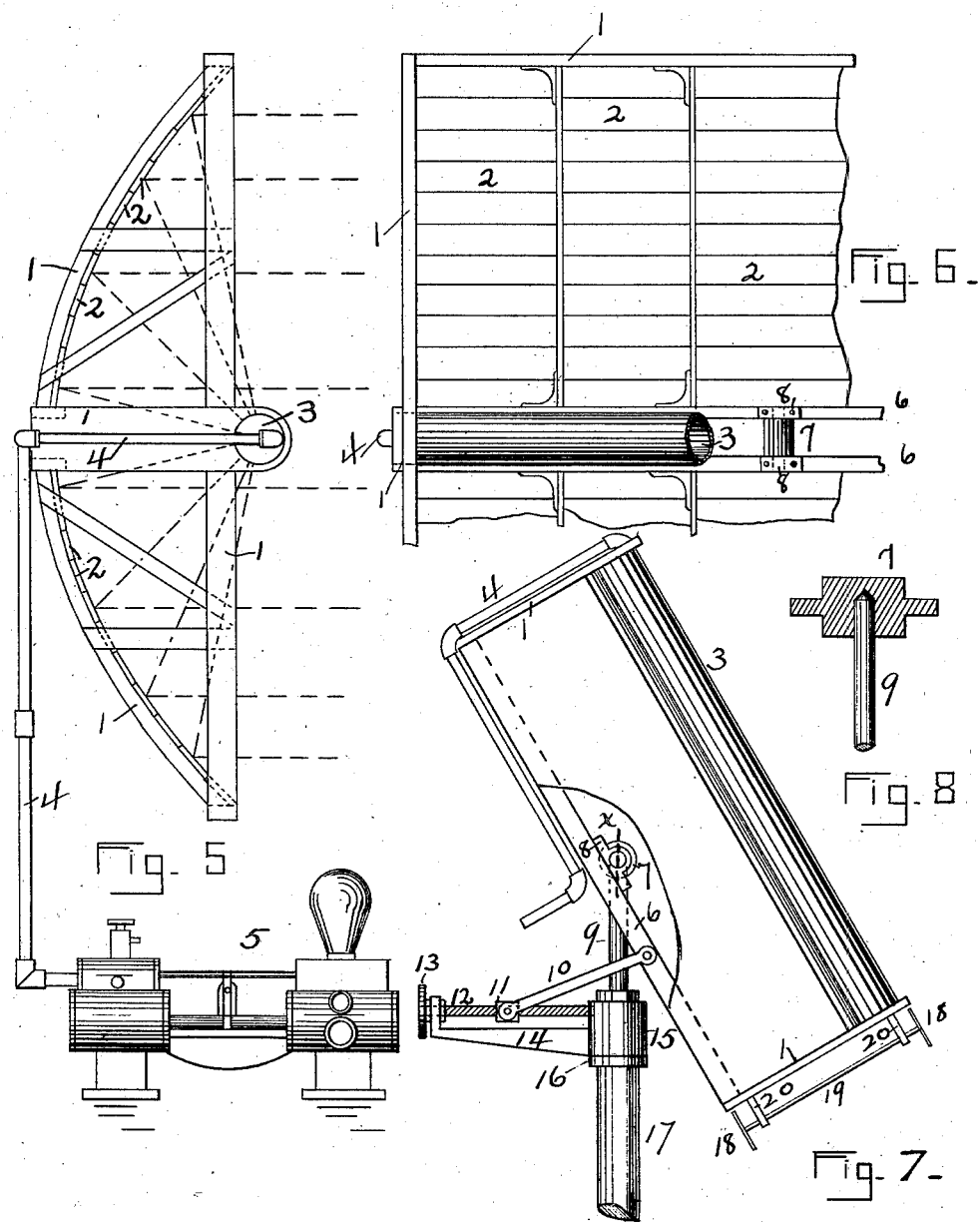

UNITED STATES PATENT OFFICE.

MELVIN L. SEVERY, OF BOSTON, MASSACHUSETTS, ASSIGNOR TO HIMSELF, FRANCIS DOANE, AND CHARLES F. CROWELL, TRUSTEES, OF SAME PLACE.

APPARATUS FOR THE UTILIZATION OF SOLAR HEAT.

SPECIFICATION forming part of Letters Patent No. 497,079, dated May 9, 1893.

Application filed November 10, 1892. Serial No. 451,554. (No model.)

*To all whom it may concern:*

Be it known that I, MELVIN L. SEVERY, a citizen of the United States, residing at Boston, in the county of Suffolk and State of Massachusetts, have invented certain new and useful Improvements in Apparatus for the Utilization of Solar Heat, of which the following, taken in connection with the accompanying drawings, is a specification.

This invention relates to apparatus for utilizing solar heat by concentrating the rays from the sun upon a boiler or other vaporizing chamber, and has for its object: First. The production of an apparatus whereby the boiler or vaporizing chamber may be carried by and supported in the axis of a concentrating device having a movement co-incident with the diurnal path of the sun, and whereby the axis of the concentrator may be maintained parallel or co-incident with the rays at all times during the day, at all seasons of the year, and in every latitude, and also so that a given part of the boiler or vaporizing chamber may be retained normally and substantially lowermost. Second. To provide the concentrator with a device whereby the co-incidence of the rays of the sun with the axis of the concentrator may be ascertained.

To these ends the invention consists: First, in the combination, substantially as hereinafter more fully set forth, of a boiler or other vaporizing chamber and a device for concentrating the solar rays and means for supporting the same, whereby the boiler and concentrating device are made capable of a movement angularly to the plane of the horizon, and of a movement of rotation upon a vertical axis. Second. In the combination, substantially as hereinafter more fully set forth, with said boiler and concentrating device, of two disks attached to opposite ends of a rod fixed in a position parallel to the axis of the concentrating device.

In the accompanying drawings, I have shown an apparatus which embodies the principles of my invention, the concentrating device being made up of a series of segments arranged side by side and curved upon the arc of a parabola, but the invention may be carried into effect when the concentration of the rays upon the boiler is effected by refraction. I have also shown this reflector as used to concentrate the solar rays upon a boiler for the generation of steam, which boiler may be arranged horizontally or vertically.

Figure 1:
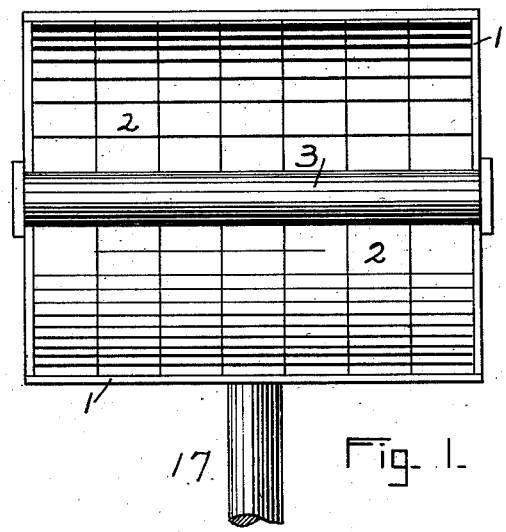
Figure 2:
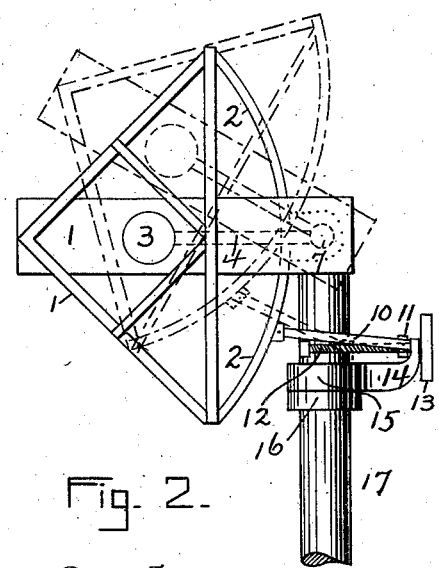
Figure 4:
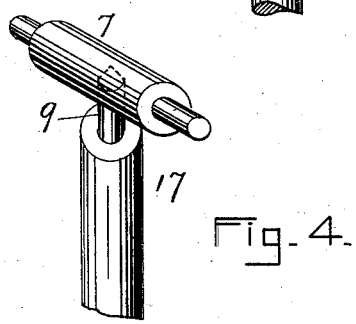
Figure 3:
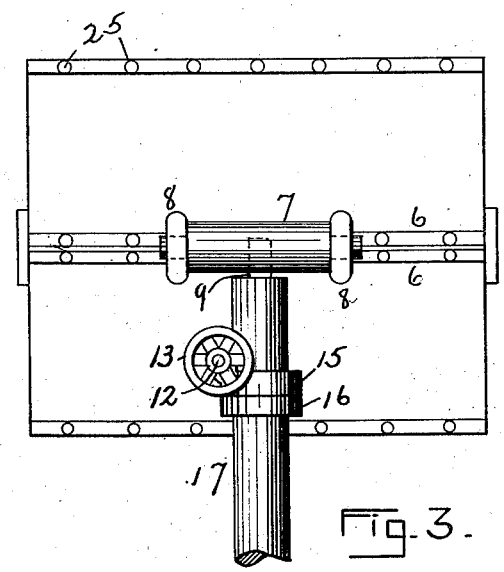

In the drawings, Figure 1 is a view in front elevation of a horizontal steam boiler suitably supported in front of a horizontal reflector. Fig. 2 is an end view of the same and of the supporting device. Fig. 3 is a view in rear elevation of the same. Fig. 4 is a perspective view of part of the trunnion and supporting vertical rod. Fig. 5 is a top view of a reflector and of a vertical cylindrical boiler supported in front of the reflector. Fig. 6 is a front view of part of the reflector and boiler. Fig. 7 is an end view of the vertical reflector, boiler and supporting device. Fig. 8 is a sectional view of the trunnion and supporting vertical rod, shown in Fig. 4.

In the several figures the same numbers refer to the same parts.

At the equator, the sun rises about due east at all times during the year, and its apparent path in the sky is a semi-circle, in approximately a vertical plane. If a boiler were so supported on a reflector as to move with the same, this boiler, if the reflector has an angular movement only in a vertical plane, would necessarily be reversed in position when the reflector follows the descending sun, so that that part of the boiler which was lowermost when the reflector was opposite to the rising sun, would be uppermost when the reflector was opposite the setting sun. This change in position would prevent the use of such boiler, and therefore another movement must be provided, namely, the rotation of the reflector on a vertical axis, so that when the reflector has reached a horizontal position it would be possible, by turning the boiler and reflector half way around in a horizontal plane, to keep the same part of the boiler which was lowermost as the reflector followed the ascending sun lowermost as the reflector follows the descending sun. Within the arctic circle at the time of the summer solstice the sun never sets, but at midnight is due north, and describes a circle around the horizon a few degrees above the same. At this time and place, therefore, a movement of rotation on a vertical axis is all that is necessary to keep the reflector opposite to the sun in its diurnal movement, and no angular movement is required. In order that the reflector may be kept opposite to the sun at all seasons and in all latitudes during its diurnal movement, and at the same time that the same part of the heater may be constantly maintained in the lowermost position, a combination of these two movements is required, and this result is accomplished by the mechanism herein described.

Referring to the drawings, 1 is the reflector which is so constructed as to have a cylindrical reflecting surface, preferably of parabolic cross-section, for the reason that it is the property of this curve, as is well known, to bring to a common focus all parallel rays normally incident upon it; but I do not limit myself to this curve, as other curves may answer measurably well. The reflector may be made of a sheet of any suitable material bent into the proper form, but it is shown in the drawings as composed of a series of segments, 2, arranged side by side and supported in a suitable frame.

In Figs. 1, 2 and 3, the cylindrical reflector is shown as placed horizontally, and in Figs. 5, 6 and 7 as placed vertically.

3 is a cylindrical steam boiler which is attached to the reflector and placed in or near the focus of the same, so that all the solar rays incident upon the surface of the reflector may fall upon the surface of the boiler, as shown by the dotted lines in Fig. 5, thus subjecting an extended surface of the boiler throughout its entire length to the action of the heat.

7 is a trunnion which is pivoted upon the vertical rod, 9, supported in the standard 17, and to this trunnion the reflector is attached by means of the boxes 8, 8, fixed to the back of the frame of the reflector. The reflector is thus made capable of movement in a vertical plane as shown in Fig. 2, in which two positions of the boiler and reflector are shown, one by full, and the other by dotted lines; and also of movement in a horizontal plane upon the pivot 9, and by the combination of these two movements the reflector can be constantly maintained in a position to receive the full effect of the solar rays. These movements can be effected automatically by suitable mechanism, or by hand. Suitable mechanism for accomplishing this result by hand is shown in the drawings, and will be now described, but I do not limit myself to this particular device.

15 is a collar which turns upon the standard 17, and is supported by the ring 16 fixed to this standard. Attached to this collar is the rotatable horizontal arm 12 having a screw thread thereon and supported by the bracket 14, attached to the collar 15, and on this arm is a head 13, by means of which the screw can be turned by hand. On this screw is the nut 11, and this nut is connected to the back of the reflector by the link 10, pivoted at one end to the nut, and at the other end to the back of the reflector below its point of support. By rotating the screw the nut will be made to move upon the screw, and in accordance with its backward and forward movement, the reflector will be more or less inclined. When the nut is moved close to the collar 15, the reflector will be nearly horizontal, and when the nut is moved close to the end of the bracket 14, the reflector will be nearly vertical. Owing to the fact that the trunnion 7 is capable of rotation on the pivot 9, the angular movement of the reflector will not be required to exceed ninety degrees, and can thus be effected by the movement of the nut, the outward movement of the nut carrying the reflector through the arc of the angle opening toward the east, and the inward movement of the nut carrying the reflector through the arc of the angle opening toward the west. In the movement of the reflector and boiler, the same part of the boiler always remains in the lowermost position. The steam generated in the boiler is carried from the top of the same by a pipe, 4, and this steam may be used for any purpose, as for example, as shown in Fig. 5, for operating a pump, 5. Owing to the movement of the boiler, a short piece of pipe near the trunnion and pivot should be flexible.

In order to ascertain from time to time whether or not the parallelism of the axis of the concentrating device with the solar rays incident upon the concentrating device has been maintained, I employ a device substantially like that shown in Fig. 7. It consists of a rod, 19, suitably supported upon the end of the reflector and parallel with the axis of the same. At each end of this rod is a disk, 18. If the shadow of the upper disk falls upon the other disk so that the rays of the sun are excluded from the latter, it will be known that the axis of the concentrating device is parallel to the solar rays incident upon it.

Having thus described my invention and the operation thereof, what I claim, and desire to secure by Letters Patent of the United States, is—

1. In an apparatus for utilizing solar energy, a device for concentrating the rays, a boiler or other vaporizing chamber arranged substantially in the focus of the concentrator, and a frame carrying both the concentrator and vaporizing chamber, the said frame being rotatable vertically and horizontally, substantially as shown and described.

2. In an apparatus for utilizing solar energy, a device for concentrating the rays, a boiler or other vaporizing chamber arranged substantially in the focus of the concentrator, a frame carrying both the concentrator and vaporizing chamber, the standard 17 having a trunnion 7 pivoted so as to be rotatable horizontally and upon which the said frame is mounted, the rotatable collar 15 on the standard, the screw rod 12 supported by the collar, nut 11 on said rod, and link 10 connecting the nut and the frame, in combination, substantially as shown and described.

3. In an apparatus for utilizing solar heat, the combination with a device for concentrating the rays, of a rod arranged parallel with the axis of the concentrator and having a plate or disk at each end, substantially as and for the purpose explained.

In testimony whereof I have hereunto subscribed my name this 7th day of November, A. D. 1892.

MELVIN L. SEVERY.

Witnesses:
D. W. ALLEN,
CHAS. A. KELLOGG.